(12) United States Patent
Carter (10) Patent No.: US 10,404,462 B2
(45) Date of Patent: Sep. 3, 2019

(54) SYSTEMS AND METHODS FOR DOCUMENT AUTHENTICITY VALIDATION BY ENCRYPTING AND DECRYPTING A QR CODE

(71) Applicant: Unisys Corporation, Blue Bell, PA (US)

(72) Inventor: Paul L Carter, Wellington (NZ)

(73) Assignee: Unisys Corporation, Blue Bell, PA (US)

( * ) Notice: Subject to any disclaimer, the term of this patent is extended or adjusted under 35 U.S.C. 154(b) by 13 days.

(21) Appl. No.: 14/732,901

(22) Filed: Jun. 8, 2015

(65) Prior Publication Data

US 2015/0358163 A1   Dec. 10, 2015

(30) Foreign Application Priority Data

Jun. 10, 2014 (NZ) ........................................ 626051
Jun. 17, 2014 (NZ) ........................................ 626724

(51) Int. Cl.
*H04L 9/32* (2006.01)
*G09C 5/00* (2006.01)
*G06F 21/64* (2013.01)
*G06Q 20/34* (2012.01)

(52) U.S. Cl.
CPC .......... *H04L 9/3226* (2013.01); *G06F 21/645* (2013.01); *G09C 5/00* (2013.01); *G06Q 20/341* (2013.01)

(58) Field of Classification Search
CPC ......... G06F 21/36; H04N 1/44; H04L 9/3281; H04L 9/3247; G06Q 20/341
USPC ........................................................... 713/179
See application file for complete search history.

(56) References Cited

U.S. PATENT DOCUMENTS

| 8,984,288 B1* | 3/2015 | Saylor | H04L 9/3281 |
| | | | 713/176 |
| 9,331,856 B1* | 5/2016 | Song | H04L 9/3247 |
| 2005/0132194 A1* | 6/2005 | Ward | G06Q 20/341 |
| | | | 713/176 |
| 2006/0278724 A1* | 12/2006 | Walker | G06F 17/211 |
| | | | 235/494 |
| 2006/0288281 A1* | 12/2006 | Merz | G06F 17/2217 |
| | | | 715/258 |
| 2011/0055585 A1* | 3/2011 | Lee | H04L 9/0844 |
| | | | 713/183 |
| 2012/0023335 A1* | 1/2012 | Bals | H04N 1/32133 |
| | | | 713/176 |
| 2012/0308003 A1* | 12/2012 | Mukherjee | H04L 9/3247 |
| | | | 380/243 |

(Continued)

*Primary Examiner* — Bryan F Wright (57) ABSTRACT

Embodiments described herein combine both glyph technologies and cryptography technologies by encrypting data with a private key of an entity tasked with issuing controlled documents, and then converting the resulting encryption as a visual glyph, such as a QR code. This permits validation of the printed document by scanning the QR code using a smartphone and decrypting using the issuing entity's public key. In some embodiments, a purpose-built software application executed by the smartphone may automatically recognize QR codes on a document presented for review and then automatically decrypt the QR code using the public key of the issuing entity. A user performing the validation may then compare the document's content with the decrypted data on the smartphone.

16 Claims, 7 Drawing Sheets

(56) References Cited

U.S. PATENT DOCUMENTS

| | | | | |
|---|---|---|---|---|
| 2013/0247218 A1* | 9/2013 | Jhingan | .................. | G06F 21/36 |
| | | | | 726/27 |
| 2013/0272523 A1* | 10/2013 | McCorkindale | ......... | H04N 1/44 |
| | | | | 380/243 |
| 2014/0254796 A1* | 9/2014 | Li | ........................ | H04L 9/3247 |
| | | | | 380/246 |
| 2015/0012339 A1* | 1/2015 | Onischuk | ............... | G07C 13/00 |
| | | | | 705/12 |

* cited by examiner

SYSTEMS AND METHODS FOR DOCUMENT AUTHENTICITY VALIDATION BY ENCRYPTING AND DECRYPTING A QR CODE

CROSS-REFERENCE TO RELATED APPLICATIONS

This application is related to U.S. patent application Ser. No. 14/7732,897 and filed Jun. 8, 2015, and U.S. patent application Ser. No. 14/732,903, filed Jun. 8, 2015, which are hereby incorporated by reference in their entirety.

FIELD OF THE DISCLOSURE

The subject matter disclosed herein generally relates to digitally validating official documents and other instruments, such as birth certificates.

BACKGROUND

Certain algorithms may be implemented to convert binary into various types of visual glyphs, which may used to convey information to other devices when the glyphs are scanned. These types of glyphs could include one-dimensional or two-dimensional matrix barcodes, such as a universal product code (UPC) barcode and a quick response (QR) code. Glyphs, such as QR codes, are a type of matrix barcode (or two-dimensional barcode), which uses a machine-readable optical label that contains information that can by interpreted by devices utilizing the appropriate software. In many cases, the QR code conveys information about an item to which it is attached. A single QR code can contain up to around 4,000 bytes of data, but the maximum practical QR code size is around 2,000 bytes. Although QR codes are a well-known means of conveying information, they can be interpreted quite easily due to their ubiquity. What is needed is a means for protecting the information of the QR code before the binary data is converted to its respective QR code.

SUMMARY

The systems and methods described herein resolve the issues described above and also provide a number of other benefits. The systems and methods combine two signature validation technologies—machine-readable glyphs (e.g., QR codes) and cryptography. Portions of a digital image representing an official document, or other document for which forgery must be mitigated, may be extracted and then encrypted. Encrypting these portions of the digital image may result in an encrypted binary data set, which is then converted to a machine-readable glyph. The glyph may then be attached to the digital image of the official document. Later, when a document bearing a glyph is presented for review, the glyph may be scanned with a mobile device or barcode scanner that coverts the glyph back to the binary stream, and then decrypts the binary data. An administrative user may then compare the document under review with electronic records and digital images to confirm the authenticity of the document under review. In alternative systems and methods, the database records related to the official document to be issued may be encrypted and converted to a glyph, which is then attached an electronic document version of the official document. When a document bearing a glyph is presented for review, the mobile device or scanner may convert the glyph to the binary data and then decrypt the binary data into the database records. These records may then be compared against the document presented for review to determine its authenticity.

In one embodiment, a processor-implemented method of reviewing and verifying documents having managed distribution, the method comprises capturing, by a mobile device, a glyph located on a document under scrutiny, wherein the scrutinized document purportedly corresponds to an issued document issued by an entity; converting, by the mobile device, the glyph to a machine-readable message using an algorithm associated with a type of the glyph; and decrypting, by the mobile device, the message using an encryption key of an encryption algorithm used by the issuing entity to encrypt digital image of at least a portion of the issued document purportedly corresponding to the scrutinized document.

In another embodiment, a processor-implemented method of reviewing and verifying documents having managed distribution, the method comprises capturing, by a mobile device, a glyph located on a first document under scrutiny, wherein the first document is purportedly a verified document issued by an entity; converting, by the mobile device, the glyph to a binary message using an algorithm associated with a type of the glyph; and decrypting, by the mobile device, the message using an encryption key in accordance with an encryption algorithm used for encrypting data from a database record related to the verified document It is to be understood that both the foregoing general description and the following detailed description are exemplary and explanatory and are intended to provide further explanation of the invention as claimed

BRIEF DESCRIPTION OF THE DRAWINGS

The accompanying drawings constitute a part of this specification and illustrate an embodiment of the invention and together with the specification, explain the invention.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Data is commonly protected by encryption algorithms that obfuscate binary data. Data encryption may be performed using symmetric and/or asymmetric encryption algorithms. In symmetric encryption, a single key may be used for both encryption and decryption. In asymmetric encryption, a private key is used for encryption and a corresponding public key is used for decryption. In asymmetric encryption, once data is encrypted with the private key, it can only be decrypted with the public—the private key will not be able to decrypt the data. Asymmetric encryption ensures that only a specific public key can decrypt a binary data or a message that was encrypted with a specific private key counterpart. Note that a private and public key are related to each other, but they have different values. Also note that knowledge of the value of one of the keys is insufficient to derive the value of the other key. If an encryption is successfully decrypted using a public key, then this success guarantees that the encryption was created using the associated private key.

Embodiments described herein combine both glyph technologies and cryptography technologies by encrypting data with a private key of an entity tasked with issuing controlled documents, and then converting the resulting encryption as a visual glyph, such as a QR code. This permits validation of the printed document by scanning the QR code using a smartphone and decrypting using the issuing entity's public key. In some embodiments, a purpose-built software application executed by the smartphone may automatically recognize QR codes on a document presented for review and then automatically decrypt the QR code using the public key of the issuing entity. A user performing the validation may then compare the document's content with the decrypted data on the smartphone.

Asymmetric encryption may be accomplished using a private/public key combination of any size. In some implementations, the encryption keys may be a 2048-bit key using the Rivest-Shamir-Adelman (RSA) encryption algorithm, or the like. Such encryption keys and algorithms may provide a maximum payload of 256 bytes, which, in many cases, may be more than adequate for encrypting text or data fields pulled from electronic versions of issued documents. But, in many cases, a maximum payload of 256 bytes may be too small for encrypting image-based electronic versions of issued documents. Alternatives for overcoming such limitations are the use of multiple RSA encryptions or use of larger encryption keys.

An additional or alternative methodology for generating a glyph that resolves a maximum payload limitation may be storing portions of data or portions of the images, extracted from the electronic version of the issued document, as unencrypted data in the glyph being generated, such as a QR code. In this embodiment, a private key may be used to encrypt a hash of the extracted data or image portion and then add the encrypted hash to the QR code. Here, an issuing entity or other private key holder, effectively establishes a signature for the data or image that was extracted from the electronic document.

An additional or alternative methodology for generating a gyph that resolves a maximum payload limitation may be using a unique random symmetric key that is encrypted using a private asymmetric key. That is, for each electronic document, automated processes may create a new unique random symmetric key using any number of known methods. The symmetric key may then be encrypted using the private asymmetric key. The encrypted symmetric key may then be included in the QR code. The symmetric key may then be used to encrypt portions of data or portions of the image extracted from the issued document. The symmetrically-encrypted data is then added to the QR code. Embodiments implementing these techniques may utilize symmetric encryption algorithms and asymmetric encryption algorithms.

Image-Based Glyphs

Figure 1:
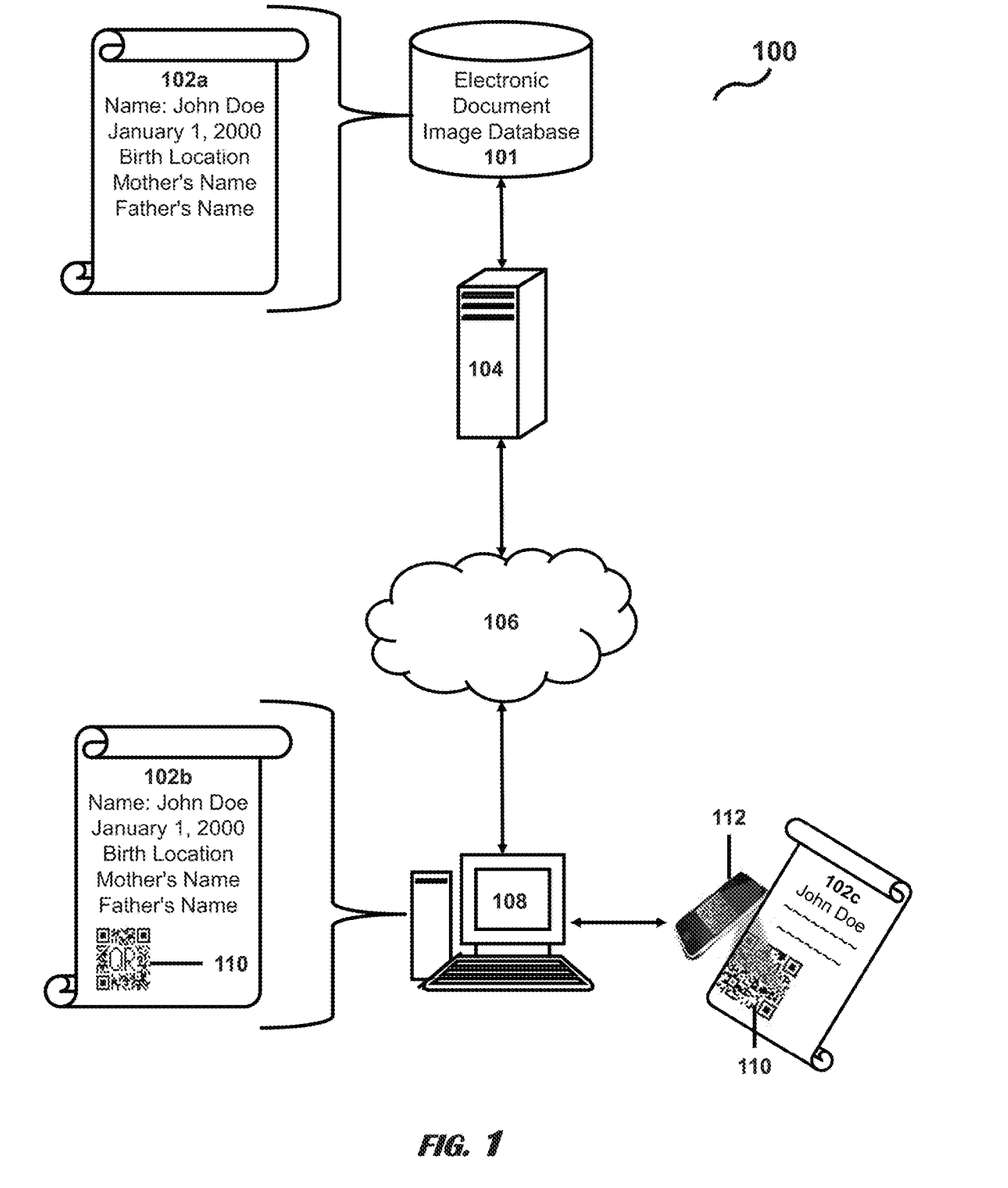
FIG. 1 shows a system for validating documents using image-based glyphs according to an exemplary system embodiment.

FIG. 1 shows a system for validating documents 100 using image-based glyphs according to an exemplary system embodiment. In the exemplary system 100, a document database 101 storing electronic documents 102*a*, which may be digitized copies of hardcopy documents, may transmit and receive electronic documents 102*a* over a network 106 to and from a computer 108 that accesses the document database 101. A server 104 controls access to the database and other system resources. A software module executed by the computer 108 requests documents 102*a*, extracts certain information from the electronic documents 102*a*, and then uses that information to generate a verification glyph 110. The computer 108 generates a verification document 102*b* (i.e., the electronic document 102*a* from the document database that bears the verification glyph 110). A mobile device 112 executing a software module of the system 100 may comprise an optical instrument that may capture or scan verification glyphs 110 of documents 102*c* presented for inspection to determine whether the document 102*c* under scrutiny is a forgery and/or if there are any errors in the information on the scrutinized document 102*c*.

The system 100 may be implemented by an entity responsible for issuing documents ("issuing entity"), controlling access to the documents, ensuring accuracy of the documents, and mitigating forgery of the documents. It should be understood that issuing entities may be government authorities (e.g., immigration services, health and human services, motor vehicles departments), registered issuing entities (e.g., hospitals, mortuaries, midwives, clergy), financial institutions (e.g., banks, mortgagees, loan originators), legal professionals and institutions (e.g., law firms, judges, law enforcement, courthouse). The issuing entity may initially generate new documents as electronic documents 102*a*, and then print the electronic documents 102*a* into a hardcopy format to be issued or archived in a secure facility. The electronic documents 102*a* may then be stored into a document database 101. In some implementations, the entity may use scanners (not shown) to convert existing hardcopy documents into electronic documents 102*a* that may be stored into the document database 101, thereby mitigating vulnerabilities to the existing hardcopies and information therein. The electronic documents 102*a* may be made ubiquitously available to computers 108 and devices 112 over a network 106.

A document database 101 may be a non-transitory machine-readable storage medium storing electronic documents 102*a*. Electronic documents 102*a* may be computer files containing digitized versions of documents issued by an issuing entity. Generally, the documents described herein may be any documents that are subject to controlled distribution and oversight, such as a birth certificate and a passport, though nothing in this application should be construed as limiting what documents may used for embodiments of the system 100; both embodiments described herein and falling within the scope of the disclosure. Non-limiting examples of documents, as used herein, may be documents relating to vital records (e.g., birth certificate, marriage license, death certificate), official records (e.g., a passport, a driver's license, a unit of currency, a security, a visa), and instruments relating to legal and financial services (e.g., a contract, a loan, a mortgage, a will, a trust, a deed). The electronic documents 102a may contain the documents in text-based or data-based file formats (e.g., .txt, .doc, .pdf, .xml, .html), or in image-based file formats (e.g., .gif, .png, .pdf, .jpg).

As an example, a health services authority issuing a new birth certificate uses software to create the birth certificate and then outputs a digital image of the birth certificate. The digital image may then be stored as an electronic document 102a in a document database 101 of the health services authority.

A server 104 may be any computing device comprising a processor and non-transitory machine-readable storage media capable of executing the software modules and processes described herein. It should be appreciated that a server 104 may be one or more computing devices operating in concert to perform the tasks and processes of the server 104 (i.e., a distributed computing environment). In some embodiments, the server 104 may be associated with one or more issuing entities, and service one or more document databases 101. It should also be appreciated that a server 104 may be the same physical computing device as a document database 101 or computer 108.

A server 104 may comprise an authentication service for authenticating users seeking access to the system 100. For example, a user operating a computer 108 may be attempting to login into the system 100 to retrieve electronic documents 101 from the document database 101. The server 104 may provide and store credentials for accessing resources of the system 100.

A server 104 may comprise a keystore generating and/or storing encryption keys. As will be described later, encryption keys may be used for encrypting and decrypting aspects of electronic documents 102a. In embodiments, software modules executed by user devices 108, 112 of the system 100 may store encryption keys on the user devices 108, 112. In some embodiments, the user devices 108, 112 may be instructed by the software module to fetch one or more encryption keys from the server's 104 keystore so that the encryption keys may be used by the user devices 108, 112 or stored on the user devices 108, 112 until needed.

A network 106 may be any common communication architecture facilitating communication between system devices 101, 104, 108, 112. One having ordinary skill in the art would appreciate that the network 106 may be a public network (e.g., Internet), a private network (e.g., intranet), or a hybrid of public and private networks. The network 106 may utilize one or more networking technologies for facilitating communications (e.g., TCP/IP, Wi-Fi, WiMax, 3G, 4G, GSM). The network 106 may comprise one or more networking devices needed to operate the network 106 based on the networking technologies used, such as firewalls, routers, switches, cellular towers, and telecommunications trunks.

A computer 108 may be any computing device comprising a processor and non-transitory machine-readable storage media capable of executing the software modules and processes described herein. In some embodiments, the computer 108 may execute a software module designed to operated with the system 100. The software module may be used for transmitting data to a server 104 hosting a document database 101, managing the system 100, and retrieving electronic documents 102a from the document database 101. The software module may be native to the computer or be a web-based interface hosted by the server 104. The computer 108 may download the software module from a server 104 or the server 104 push the software to the computer 108 for the computer 108 to install and execute. In some embodiments, system administrators may establish certain settings instructing the computer 108 on parameters for executing the software. Settings may be established at the computer 108 or at the server 104.

A computer 108 may comprise software generating verified documents 102b using electronic documents 102a pulled from a document database 101. A verified document 102b may be an electronic document 102a that has received a verification glyph 110 generated by the computer 108. The verification glyph 110 may be the result of a device applying an algorithm that converts binary machine-readable data to a mark representing that binary data, thereby rendering the glyph capable of conveying the binary data to another device that is capable of converting the glyph back to the binary data using the appropriate algorithm. Non-limiting examples of a verification glyph may include a linear barcode (e.g., UPC) and two-dimensional matrix barcode (e.g., QR code), a visual watermark, a steganography glyph, and a ShotCode. The software module of the system 100 executed by the computer 108 may encrypt all or part an electronic document 102a stored as a digital image by using an encryption algorithm, then the computer 108 may convert the encrypted binary data of the digital image to the verification glyph 110. Settings in the software may determine which aspects of the digital image electronic document 102a will be encrypted and converted into the verification glyph 110. The computer 108 may create the verification document 102b by overlaying the verification glyph 110 onto the original digital image electronic document 102a. The computer 108 may transmit the verification document 102b to a document database 101 for non-transitory machine-readable storage. In some embodiments, the computer 108 may print the verification document 102b for an issuing entity to provide a hardcopy version of the document to the recipient. A printer (not shown) may be directly connected to the computer 108 or may be accessible to the computer 108 over a network 106.

A mobile device 112 may be any computing device optimized for mobility and comprising processors and non-transitory machine-readable storage capable of performing the tasks and processes described herein. Non-limiting examples of a mobile device may include a smartphone, a tablet, an inventory barcode scanner, and a laptop. The mobile device 112 may comprise an optical instrument, such as a camera or a barcode scanner, which is capable of capturing or scanning a verification glyph 110 placed on a document 102c under scrutiny. The mobile device 112 may be connected, by a wire or wirelessly, to a computer 108 in order to transmit the information for conversion and decryption. In some embodiments, the mobile device 112 may execute software capable of applying the requisite algorithms used for converting the verification glyph 110 to binary data and decrypting binary data. The mobile device 112 may receive the software of the system 100 from the computer 108 or a server 104. The software may download encryption keys and other necessary algorithms and settings for the mobile device 112 to convert verification glyphs 110 and/or decrypt binary data conveyed by the verification glyphs 110.

Figure 2:
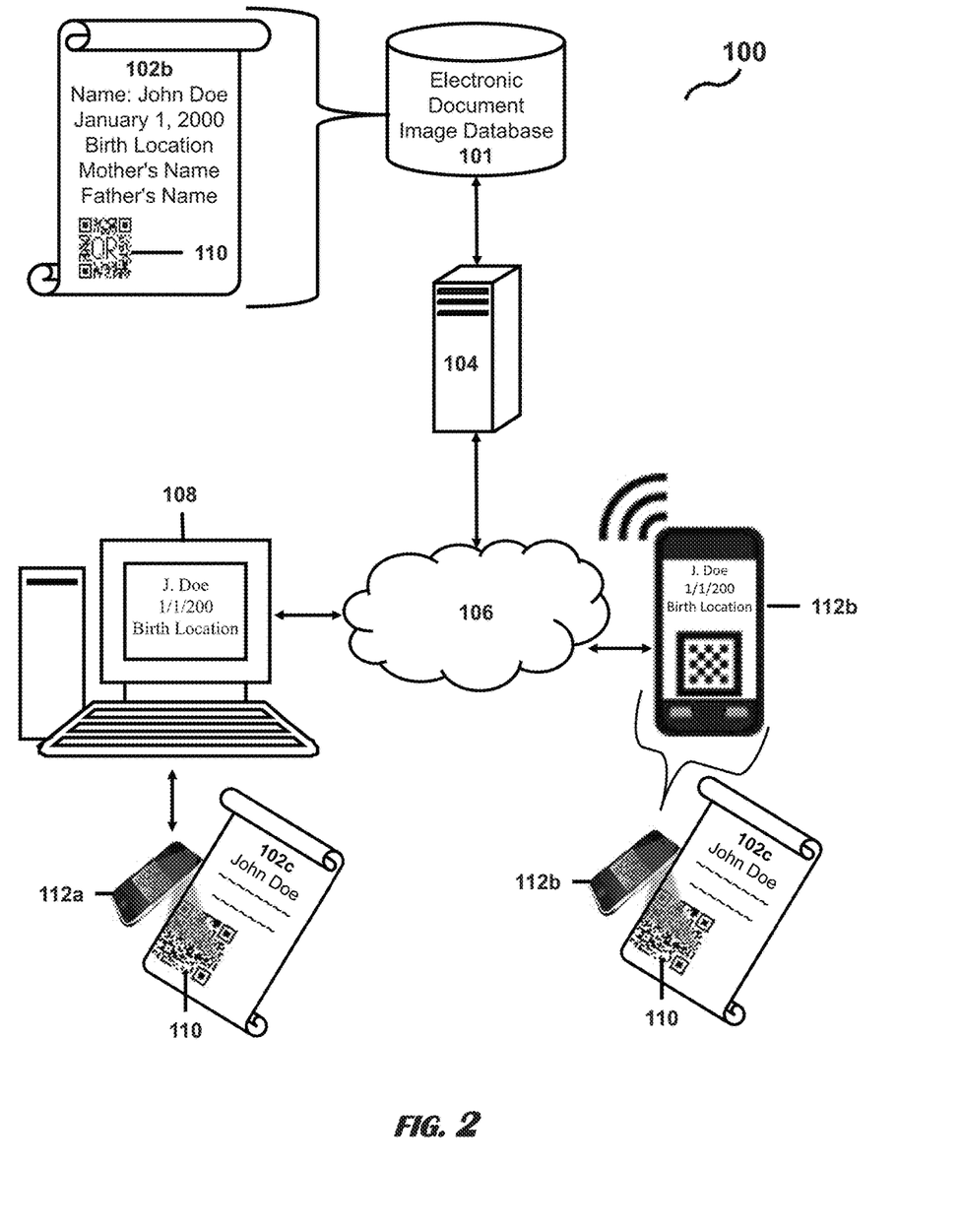
FIG. 2 shows a system for validating documents using image-based glyphs according to an exemplary system embodiment.

FIG. 2 shows the system for validating documents 100 using image-based glyphs, during document validation, according to the exemplary system embodiment of FIG. 1.

As previously mentioned, a mobile device 112a may be connected to a computer 108 via a wire or wireless connection. The mobile device may comprise an optical instrument, such as a camera or barcode reader, capable of capturing a verification glyph 110 from a document 102c under scrutiny. In some embodiments, the mobile device 112a transmits the scanned verification glyph 110 to the computer 108 for further processing. It should be appreciated that the workload may be split between the computer 108 and the mobile device 112 in any number of ways. For example, the mobile device 112 may capture the verification glyph 112 and convert the glyph to a binary message for the computer 108 to decrypt.

A computer 108 may comprise a monitor displaying a user interface generated by software executed by the computer's 108 processor. As previously mentioned, the computer 108 may be connected with a mobile device 112a over a wired or wireless connection. In some embodiments, the computer 108 may receive a verification glyph 110 from the mobile device 112a, which captured the glyph from a document 102c under scrutiny. The computer may be connected with a server 104 hosting a document database 101 storing verification documents 102b, which may have been previously generated by an issuing entity. The computer 108 may perform various tasks for converting and decrypting data conveyed by the verification glyph 110 of the scrutinized document 102c. The computer 108 may pull a verification document 102b purportedly matching the scrutinized document 102c. The computer 108 may be configured to display the verification document 102b on the user interface.

In some embodiments, a mobile device 112b may comprise wireless communications capabilities enabling the mobile device 112b to communicate directly with a server 104 hosting a document database 101 of an issuing entity. The mobile device 112b may scan or otherwise capture a verification glyph 110 placed on a scrutinized document 102c. The mobile device may execute software instructing the mobile device 112b on performing a number of tasks for converting and decrypting the verification glyph 110. The mobile device 112b may, for example, communicate directly with the server 104 hosting the keystore in order to download the requisite public key needed to decrypt encrypted data converted from the verification glyph 110. The mobile device 112b may comprise a screen capable of displaying information in the verification document 102b that purportedly matches the scrutinized document 102c. In some embodiments, software executed by the mobile device 112b may convert image-based data in the image-based verification document 102b received from the document database 101 to a text-based data by using processes of recognizing certain characters (i.e., OCR). The mobile device 112b may display the text-based data of the verification document 102b for a user-friendly comparison with the information of the scrutinized document 102c.

Figure 3:
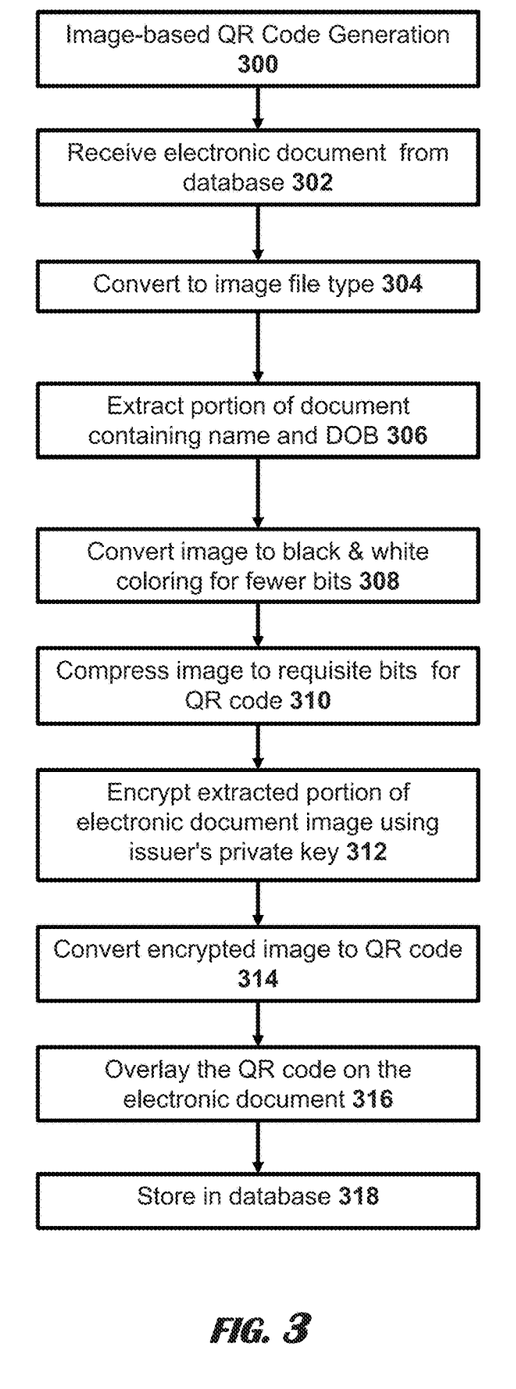
FIG. 3 shows steps of generating an image-based verification glyph for documents according to an exemplary embodiment.

FIG. 3 shows steps of an exemplary method 300 of generating an image-based verification glyph for documents. The method 300 of FIG. 3 describes generating a quick response code (QR code), which is a type of verification glyph. It should be appreciated that this method 300 is not intended to be limiting on the types of glyphs that may be used.

In a step 302, a computer receives an electronic document from a document database of an issuing entity. The electronic document may be a digital image of the document issued by the issuing entity. The electronic document received from the document database may be selected by a user or by an automated process to receive an image-based verification glyph, which may be a marking generated for the digital image of the document using data pulled from the digital image.

In an optional next step 304, an electronic document may be converted to a digital image of the document if the electronic document received does not contain a digital image of the document. In some cases, the electronic document may contain the document issued by the entity in a text-based or data-based file format (.txt, .doc, .html, .xml).

In a next step 306, a computer may extract portions of a digital image of the document issued by the entity. The portions may be critical aspects for determining whether the document is accurate, or determining whether the document is fraud. For example, if the document is a birth certificate of a person (and the electronic document is an image thereof), then the computer may identify and extract the person's name and date of birth from the digital image. In some implementations, these extracted portions may be converted by text-recognition processes to textual data.

In an optional next step 308, the digital image of the document may be converted from color to greyscale or black-and-white in order to save bits. That is, certain types of glyphs are limited in the bits that may be represented. In some cases, the number of bits to be converted to the glyph must be reduced. One way to reduce bits in an image file is to eliminate the need for bits to represent a broad range of colors. In some embodiments, the computer may be adaptive to automatically determine whether bit reduction will be necessary. This color reduction may be applied to the digital image of the document and the portions extracted therefrom.

In an optional next step 310, a computer may apply one or more compression algorithms for compressing the number of bits representing the digital image. As previously mentioned, a verification glyph may have maximum number bits that may be effectively represented. A user or automated processes may instruct the computer to apply compression techniques to the digital image of the document in order to reduce the number bits representing the digital image. These compression techniques may be applied to the digital image of the document and the portions extracted therefrom.

In a next step 312, the computer may encrypt the extracted portions of the digital image (i.e., electronic document). The computer may apply any type of encryption algorithm, symmetric or asymmetric. Preferably, the computer implements an asymmetric encryption algorithm to encrypt the extracted portion using a private key. The private key may be associated with an issuing entity, and may be controlled by a keystore managed by the issuing entity. Software executed by the computer may provide instructions to the computer for encrypting the extracted portion of the digital image, including the algorithm to apply and the encryption key to implement.

In a next step 314, the computer may convert the encrypted portions of the digital image to a QR code (i.e., verification glyph). Software executed by the computer may provide the computer with instructions regarding the type of glyph that will be generated and the algorithm needed to convert the encrypted portion of the digital image to the type of glyph. In the present method embodiment 300, the computer will convert the encrypted image portions containing a name and date of birth of a person's birth certificate to a QR code.

In a next step 316, the computer may overlay the QR code generated using the portions of the digital image (i.e., electronic document) onto the digital image stored in the document database.

In a next step 318, the computer may store the electronic document with the QR code into the document database. In some cases, the method 300 occurs while in the process of issuing the document to a person in which the computer may print the electronic document with the QR code.

Figure 4:
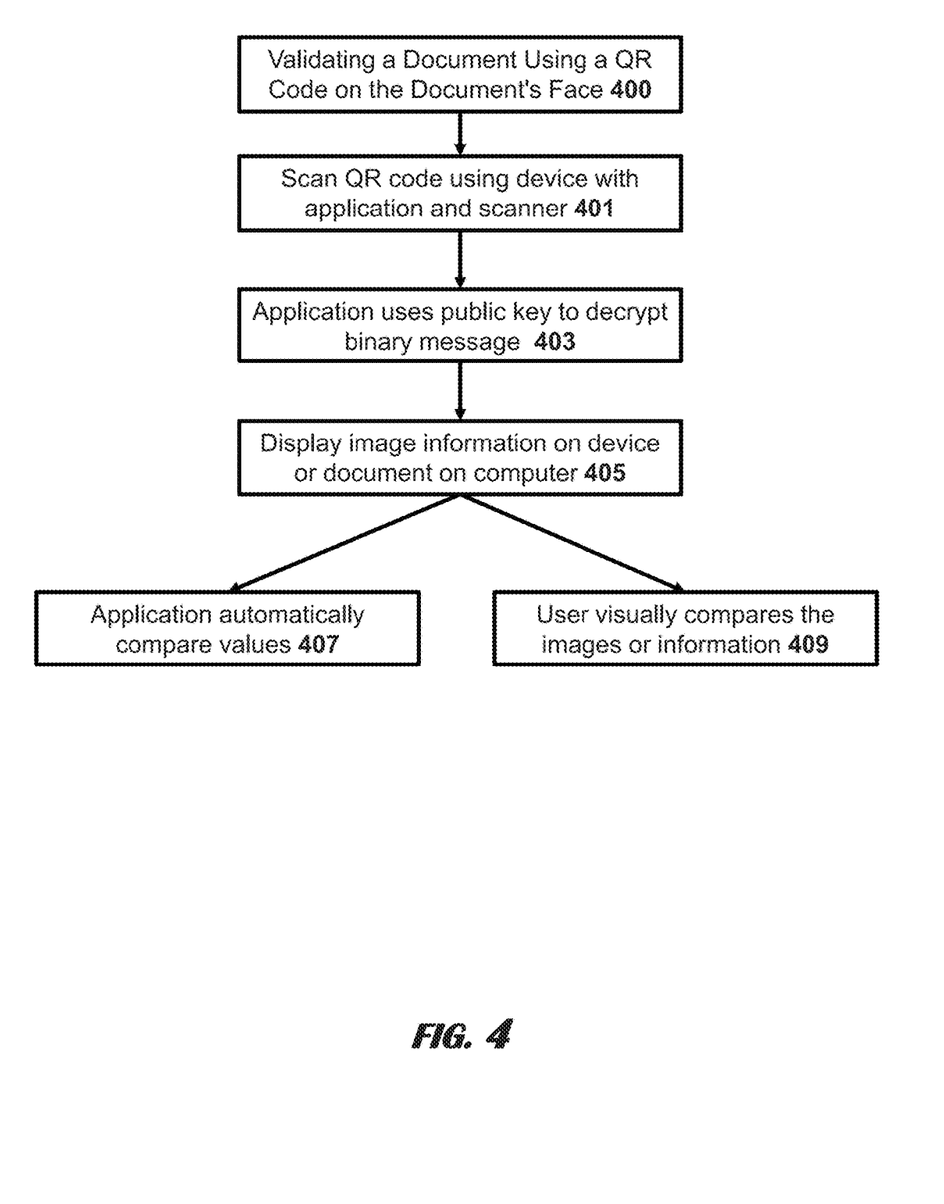
FIG. 4 shows steps of validating a document using an image-based verification glyph on a document according to an exemplary embodiment.

FIG. 4 shows steps of an exemplary method 400 of validating a document using an image-based verification glyph on a document. The method 400 of FIG. 4 describes validation using a quick response code (QR code), which is a type of verification glyph. It should be appreciated that this method 400 is not intended to be limiting on the types of glyphs that may be used. It should also be appreciated that while the steps in this exemplary method 400 are each performed by a mobile device, in some embodiments, one or more steps may be performed by a separate computing device.

In a step 401, a mobile device (e.g., smartphone, tablet, laptop, inventory scanner) comprising an optical instrument (e.g., camera, barcode scanner) scans a QR code on a document under scrutiny, which is then interpreted by a software application executed by the mobile device. The software application contains instructions for applying one or more algorithms for the device to understand the QR code. In applying an algorithm associated with the QR code, the mobile device converts the scanned image of the QR code to a series of binary bits based on the QR code algorithm. In some embodiments, the mobile device may determine whether a glyph on a scrutinized document is of the same type that is expected to be found on the originally generated verification document, which purportedly matches the scrutinized document. If the type of glyph on the scrutinized document is different from the type of the glyph on the verification document stored with the issuing entity, then the mobile device may generate a notification alerting the issuing entity the scrutinized document is likely a forgery, which a party is attempting to pass off as an authentic document issued by the issuing entity.

In a next step 403, a software application may decrypt binary data resulting from converting a QR code or other glyph to the binary data. The binary data may be encrypted according to any suitable encryption algorithm, e.g., symmetric and asymmetric. In the exemplary method 400, the QR code found on the scrutinized document was originally generated, in part, by applying an asymmetric encryption algorithm to portions of a digital image of an issued document, which results in a bit stream or binary message encrypted by a private key. Correspondingly, the mobile device may apply the asymmetric encryption algorithm, in step 403, in order to decrypt the binary message converted from the image of the QR code. The mobile device may use a public key, which is a decrypting counterpart to the private key used for the initial encryption, to decrypt the binary message. The result of the decryption in step 403 may be portions of an electronic document version of the issued document. As previously mentioned, the electronic document may be a digital image. The encrypted portions of the digital image (i.e., electronic document) may be a subset of images extracted from the digital image, or the encrypted portions may be text converted from the extracted portions of the digital image.

In a next step 405, a mobile device may display a digital image, or other format for an electronic document, which is digitized version of an issued document purportedly matching a document presented for scrutiny. In some embodiments, the mobile device may fetch the appropriate electronic document from a document database so that a user may visually compare the electronic document against the scrutinized document. In some embodiments, the mobile device may display image data converted from the QR code, or other type of glyph, on the scrutinized document, which may be visually compared or converted to some format capable of being compared against the electronic document of the issued document.

As the exemplary method 400 may be executed by any number of mobile devices and computers with varying capabilities, software of the system may determine a type of device displaying the electronic document. For example, software may recognize that a mobile device is retrieving an electronic document stored as a digital image from a document database. Likewise, the mobile device may recognize that binary data pulled from a QR code are image extractions of a digital image. In step 405, software may convert the digital image data to text using text recognition processes. Recognized text may then be displayed in a suitable format for the mobile device. In another exemplary embodiment, software may recognize that a computer will be displaying the retrieved electronic document form the document database, or will be displaying images converted from binary data pulled from a QR code. In these embodiments, rather than converting image data to simplified data for display on a smaller mobile device display, the computer may display a full digital image or electronic document of the issued document.

In an optional next step 407, software on the mobile device may compare data or images converted from a QR code or other glyph located on a scrutinized document against data or images of an electronic document stored in a document database. In some embodiments, the mobile device or other computing device may convert data or images from the QR code to a format suitable for automatically comparing the scrutinized document against a purportedly corresponding electronic document in the document database. The mobile device may present results of the comparison to a user interface for a user to determine whether the scrutinized version is a forgery, or inaccurate version, of an issued document purportedly matching the scrutinized document.

In some embodiments, software may calculate a likelihood that the scrutinized document is a forgery based on the comparison of the data pulled from the QR code of the securitized document and purportedly corresponding to the electronic document in the document database. Software may identify and compare a number of characteristics that should be found in the data converted from the QR code. Non-limiting examples of characteristics may include watermarks expected on issued documents, specific information expected to be found on the issued document (e.g., a person's name, issuing entity's name), and visual characteristics (e.g., color, font, ink) expected on issued documents.

In a next step 409, after displaying an electronic document or information converted from the electronic document that was retrieved from a document database, a user may visually compare a scrutinized document purportedly matching the electronic document. The user may then manually determine whether the scrutinized document is a forged version or inaccurate version of an issued document represented by the electronic document presented to the user on the user interface.

Data-Based Glyphs

Figure 5:
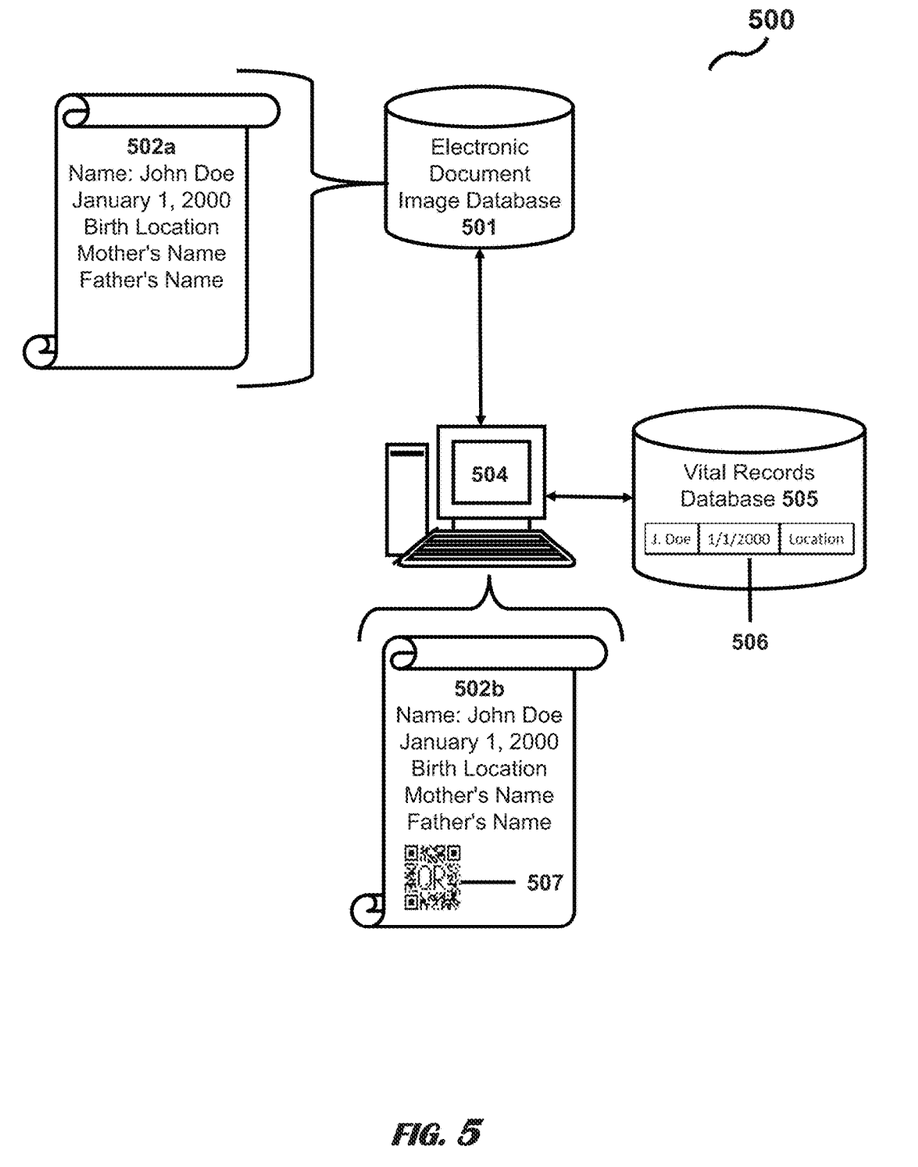
FIG. 5 shows a system for validating documents using data-based glyphs according to an exemplary system embodiment.

FIG. 5 shows a system for validating documents 500 using data-based glyphs according to an exemplary system embodiment. In the exemplary system 500, a document database 501 storing electronic documents 502a, which may be digitized versions of hardcopy documents, may transmit and receive electronic documents 502a over a network (not shown) to and from a computer 504 that accesses the document database 501. A software module executed by the computer 504 requests a record 506 stored in a records database 505, which is related to an electronic document 502a being issued, and then extracts certain information from the record 506 to generate a verification glyph 507. The computer 504 generates a verification document 502b (i.e., the electronic document 502a from the document database bearing the verification glyph 507). A mobile device (not shown) executing a software module of the system 500 may comprise an optical instrument that may capture or scan verification glyphs 507 of documents presented for inspection to determine whether the document under scrutiny is a forgery of an issued document 502b and/or if there are any errors in the information on the scrutinized document.

A records database 505 may be any computing device comprising a processor and non-transitory machine-readable storage medium capable of performing tasks and processes described herein. The records database 505 may contain records 506 of information relating to vital records, personal identifying information, financial and legal services, and operations of an official authority or registered entity that may be responsible for controlling distribution of sensitive information. For example, records 506 may be vital records, such as a birth certificate, a death certificate, or a marriage license. An issuing entity may be responsible for issuing documents populated by information contained in these records 506. In some cases, the issuing entity may be responsible for controlling distribution of issued documents and related records 506, verifying information of issued documents and related records 506, and mitigating forgery of issued documents.

Issuing entities, or a third party operating on behalf of an issuing entity, may store electronic documents 502a in a document database 501. Electronic documents 502a may be digitized versions of issued documents, which may be kept in any suitable file format for storing the electronic documents 502a. As previously described, the document database 501 may be any computing device comprising a processor and non-transitory machine-readable storage media capable of performing the steps and processes described herein. The document database 501 may be connected with a computer 504 over a network (not shown) to transmit electronic documents 502a to the computer 504, and to receive verification documents 502b from the computer 504 after the computer 504 overlays a verification glyph 507 on the electronic document 502a.

A computer 504 may be any computing device comprising a processor and non-transitory machine-readable storage media capable of performing the tasks and processes described herein. It should be appreciate that the various components and tasks of the computer 504 in the instant system embodiment 500 may be performed by any number of computing devices in a distributed computing environment. Software on a computer 504 may allow users to create new issued documents through a user interface. The software may output an electronic document 502a, which may be a digitized version of a newly created issued document. The computer 504 may also store the information used to populate the newly created issued document into a records database 505. The records database 505 may store this information in a record 506 comprising one or more data fields (e.g., name, date of birth, location of birth). Information of the records 506 may be stored in a non-transitory machine-readable storage medium. The computer 504 may retrieve a record 506 containing information that is also found in a corresponding electronic document 502a. By applying various encryption algorithms and algorithms generating a type of glyph, the computer 504 may generate a verification glyph 507 based on the data of the record 506. The computer may output a verified document 502b, which may be the corresponding electronic document 502a bearing the verification glyph 507. The issuing entity may then print out the verified document 502b to a hardcopy format, which is then provided to the appropriate party as a newly issued document.

It should be appreciated that the various computing devices 501, 504, 506 of FIG. 5 may be a single physical computing device, such as a server comprising a plurality of software modules, or the various computing devices 501, 504, 506 may be distributed among two or more physical devices. The various data and computing files may be transmitted in and among computing devices 501, 504, 506 over a network (not shown) facilitating communications between these computing devices 501, 504, 506. The network may be public, private, or a hybrid in which networking technologies are shared between publicly available resources and protected resources or resources that are not publicly available.

Figure 6:
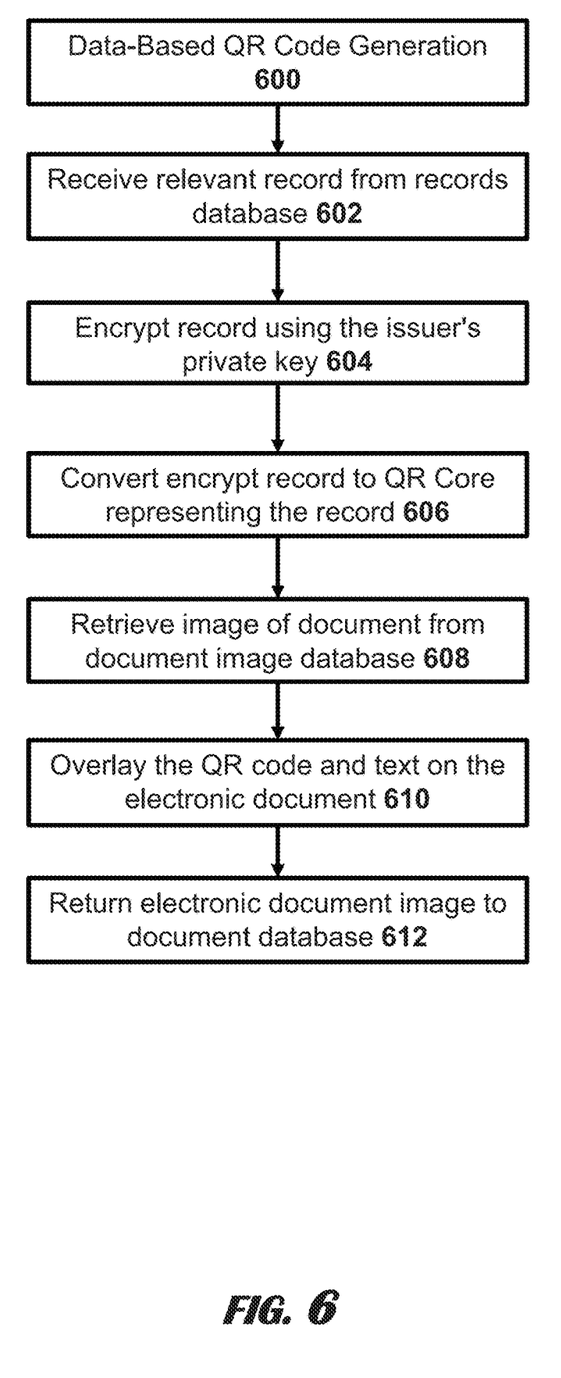
FIG. 6 show steps of generating a data-based glyph for documents according to an exemplary method embodiment.

FIG. 6 shows an exemplary method 600 of generating a data-based glyph for documents. The method 600 of FIG. 6 describes generating a quick response code (QR code), which is a type of verification glyph using data records. It should be appreciated that this method 600 is not intended to be limiting upon the types of glyphs that may be used.

In a step 602, a computer receives data records from a records database. The data records relate to the nature of the document to be issued. For example, when issuing a birth certificate for a particular person, the records received should be related to that person's birth. In many cases, the records database will be associated with the issuing entity or reside on a computer creating the new issued document. So, continuing the example of issuing a birth certificate, the birth certificate may be created using a computer that stores inputted data relating to a newborn baby. These records could be stored in a local database, within a hospital, and may be later retrieved by a computer when generating the birth certificate to be issued.

In a next step 604, one or more fields of a record may be encrypted. Database records may comprise fields containing the data of a record. For example, a record in a motor vehicles department's database may comprise a record of driver's license comprising fields for a driver's name, a driver's address, a driver's birthdate, and a driver's uniquely identifying number (e.g., social security number, customer number). A computer of the issuing entity may encrypt the data from one or more fields of the record using a symmetric or asymmetric encryption algorithm. The computer may use a private key to encrypt the data for embodiments applying an asymmetric encryption algorithm. Later, a public key acting as a counterpart to the private key may be used for decrypting the data by applying the asymmetric encryption algorithm using the public key.

In a next step 606, the computer may generate a QR code or other type of glyph using the encrypted data of the database record. After encryption, the encrypted data will be in the form of binary data. Software of the computer may apply an algorithm that generates QR codes from binary data in order to produce the QR code. It should be appreciated that any type suitable glyph may be generated from the encrypted data, and may be determined according to settings received from a central server or otherwise determined by an administrative user.

In a next step 608, a computer may retrieve from a document database, an electronic document corresponding to the record fetched from the records database. The electronic document may be a digital image of the newly-created document. A user who is operating the computer may manually identify the appropriate electronic document, or automated processes in the computer's software may associate whichever record was used to generate the QR code with the appropriate document. In some cases, there may not be a requirement to fetch the electronic document from the document database because the acts of creating the new document and generating a verified version (having a validation glyph) may occur as sequential functions when operating the software. For example, a hospital technician creating a birth certificate may input data for the records and the birth certificate using a single interface. In this example, the data may be converted to a QR code and placed onto a digital image of the birth certificate before either the records or the birth certificate are stored in the respective databases, thereby obviating step 608 for retrieving the electronic document from a document database.

In a next step 610, after retrieving or otherwise opening the electronic document, a computer may overlay a QR code or other glyph generated using data of a database record, onto the electronic document.

In a next step 618, the computer may store the electronic document with the QR code (i.e., verified document) into the document database. In some cases, the method 600 occurs while at the time of issuing the document. In such cases, the computer may print out the electronic document with the QR code to a hardcopy version, which is then provided to the appropriate party as an issued document.

Figure 7:
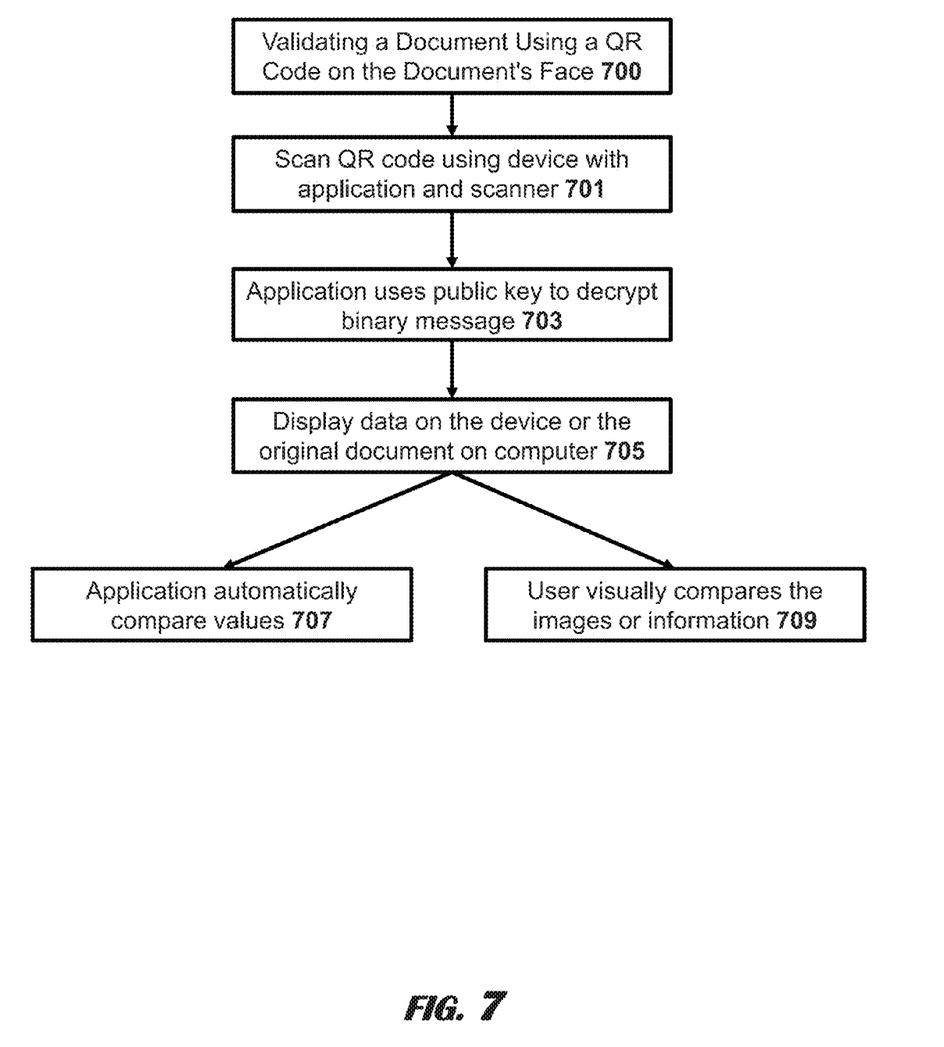
FIG. 7 shows steps of validating a document using data-based glyphs according to an exemplary method embodiment.

FIG. 7 shows an exemplary method 700 of validating a document using data-based glyphs. The method 700 of FIG. 7 describes validation using a quick response code (QR code), which is a type of verification glyph. It should be appreciated that this method 700 is not intended to be limiting on the types of glyphs that may be used. It should also be appreciated that while the steps of this exemplary method 700 are each performed by a mobile device, in some embodiments, one or more steps may be performed by a separate computing device.

In a step 701, a mobile device (e.g., smartphone, tablet, laptop, inventory scanner) comprising an optical instrument (e.g., camera, barcode scanner) scans a QR code on a document under scrutiny, which is then interpreted by a software application executed by the mobile device. The software application contains instructions for applying one or more algorithms for the device to understand the QR code. In applying an algorithm associated with the QR code, the mobile device converts the scanned image of the QR code to a series of binary bits based on the QR code algorithm. In some embodiments, the mobile device may determine whether a glyph on a scrutinized document is of the same type that is expected to found on the originally generated verification document, which purportedly matches the scrutinized document. If the type of glyph on the scrutinized document is different from the type of the glyph on the verification document stored with the issuing entity, then the mobile device may generate a notification alerting the issuing entity the scrutinized document is likely a forgery, which a party is attempting to pass off as an authentic document issued by the issuing entity.

In a next step 703, a software application may decrypt binary data resulting from converting a QR code or other glyph to the binary data. The binary data may be encrypted according to any suitable encryption algorithm, e.g., symmetric and asymmetric. In the exemplary method 700, the QR code found on a scrutinized document was originally generated, in part, by applying an asymmetric encryption algorithm to data records corresponding to the issued document. The previously applied asymmetric encryption resulted in a bit stream or binary message that was encrypted using a private key. Correspondingly, the mobile device of the method 700 may apply the asymmetric encryption algorithm, in step 703, in order to decrypt the binary message converted from the captured image of the QR code. The mobile device may use a public key, which is a decrypting counterpart to the private key used for the initial encryption, to decrypt the binary data. The result of the decryption in step 703 may be the data from the one or more fields of the database record related to the issued document.

In a next step 705, a mobile device may display the decrypted data, or a digital image of a related electronic document, which may be a digitized version of an issued document purportedly matching the document presented for scrutiny. In some embodiments, the mobile device may fetch the appropriate electronic document from a document database so that a user may visually compare the electronic document against the scrutinized document.

In an optional next step 707, software on the mobile device may compare data converted from a QR code or other glyph located on a scrutinized document against data in records database or images of the related electronic document retrieved from a document database. In some embodiments, the mobile device or other computing device may automatically compare information populated in the scrutinized document against the data of the record or the electronic document of an issued document purportedly corresponding to the scrutinized document. The mobile device or other computing device may present results of the comparison to a user interface for a user to determine whether the scrutinized document is a forgery, or inaccurate version, of the issued document.

In some embodiments, software may calculate a likelihood that the scrutinized document is a forgery based on the comparison of the data pulled from the QR code of the securitized document and data pulled from a purportedly corresponding electronic document in the document database. Software may identify and compare the data values that are expected to be found in the data converted from the QR code.

In a next step 709, after displaying an electronic document associated with an issued document or a data record associated with the issued document, a user may visually compare a document under scrutiny against the electronic document or data record in order to manually determine whether the scrutinized document is a forged version or inaccurate version of the issued document.

In example 1, which may allow validation of birth certificates, a glyph such as a QR code may be printed on a birth certificate of a particular person. The QR code, when converted to machine-readable binary code, contains an encryption of an actual digital image of portions of the birth certificate, such as portions showing a person's name and birthdate. In an alternative means of generating the glyph for the birth certificate, the QR code, when converted to binary code, may contain encrypted data from a vital record (e.g., birth certificate, death certificate, marriage license) pulled from a vital records database. In either case, when the QR code is scanned using a validation software application on a smartphone or other device, the image of the name and birthdate, or the data of the vital record may appear on the smartphone's screen. The displayed image or data may then be compared with the content of a birth certificate that was presented as the authentic, originally-issued birth certificate. These operations permit secure, off-line validation of official documents such as a birth Certificate using a smartphone or a dedicated QR Scanner workstation.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A processor-implemented method of reviewing and verifying documents having managed distribution, the method comprising:

capturing, by a mobile device, a glyph located on a document under scrutiny, wherein a correspondence between the scrutinized document and an issued document issued by an entity is to be verified, and the glyph was previously generated based on only a portion of the issued document;

converting, by the mobile device, the glyph to a machine-readable message using an algorithm associated with a type of the glyph, wherein the message was previously encrypted by a processor with a private key of the issuing entity from an image file that had been converted to a black-and-white version of the portion of the issued document, the processor having determined whether it was necessary to compress the black-and-white version of the portion to a reduced number of bits for the glyph prior to encryption with the private key, and the private key cannot be used to decrypt the message by the mobile device; and decrypting, by the mobile device, the message using a public key of an encryption algorithm used by the issuing entity to encrypt the portion of the issued document corresponding to the scrutinized document.

2. The method according to claim 1, further comprising transmitting, by the mobile device, the digital image to a computing device verifying the scrutinized document upon successfully decrypting the message.

3. The method according to claim 1, further comprising displaying, by the mobile device, at least a portion of the digital image on a user interface of the mobile device upon successfully decrypting the message.

4. The method according to claim 1, further comprising:
recognizing, by the mobile device, one or more alphanumeric characters in the digital image of the at least a portion of the issued document;
extracting, by the mobile device, the recognized alphanumeric characters into one or more data fields; and
displaying, by the mobile device, a data field on a user interface of the mobile device.

5. The method according to claim 1, wherein the type of glyph is selected from the group consisting of: a two-dimensional matrix barcode, a linear barcode, a quick response code (QR code), a visual watermark, a steganography glyph, and a ShotCode.

6. The method according to claim 1, further comprising automatically identifying, by the mobile device, the type of glyph of the scrutinized document upon capturing the glyph.

7. The method according to claim 6, further comprising automatically determining, by the mobile device, whether the type of the glyph on the scrutinized document matches the type of the glyph generated for the issued document.

8. The method according to claim 7, further comprising automatically generating, by the mobile device, a notification that the glyph of the scrutinized document does not match the issued document in response to determining the type of the glyph on the scrutinized document does not match the type of the glyph of the issued document.

9. A processor-implemented method of reviewing and verifying documents having managed distribution, the method comprising:
capturing, by a mobile device, a glyph located on a first document under scrutiny,
wherein a correspondence between the first document and a verified document issued by an entity is to be verified, and the glyph was previously generated based on only a portion of the verified document;
converting, by the mobile device, the glyph to a binary message using an algorithm associated with a type of the glyph, wherein the message was previously encrypted by a processor with a private key of the issuing entity from an image file that had been converted to a black-and-white version of the portion of the issued document, the processor having determined whether it was necessary to compress the black-and-white version of the portion to a reduced number of bits for the glyph prior to encryption with the private key, and the private key cannot be used to decrypt the machine-readable message by the mobile device; and
decrypting, by the mobile device, the message using a public key in accordance with an encryption algorithm used for encrypting data from a database record related to the verified document.

10. The method according to claim 9, further comprising transmitting, by the mobile device, the data related to the verified document to a computing device verifying the first document upon successfully decrypting the message.

11. The method according to claim 9, further comprising displaying, by the mobile device, at least a portion of the data a user interface of the mobile device upon successfully decrypting the message.

12. The method according to claim 9, further comprising displaying, by the mobile device, a digital image of the verified document.

13. The method according to claim 9, wherein the type of glyph is selected from the group consisting of: a two-dimensional matrix barcode, a linear barcode, a quick response code (QR code), a visual watermark, a steganography glyph, and a ShotCode.

14. The method according to claim 9, further comprising automatically identifying, by the mobile device, the type of glyph of the first document upon capturing the glyph.

15. The method according to claim 14, further comprising automatically determining, by the mobile device, whether the type of the glyph on the first document matches the type of the glyph generated for the verified document.

16. The method according to claim 15, further comprising automatically generating, by the mobile device, a notification that the glyph of the first document does not match the verified document.

* * * * *